United States Patent [19]

Mueller

[11] Patent Number: 4,952,914
[45] Date of Patent: Aug. 28, 1990

[54] WASHER FLUID MONITOR

[75] Inventor: Donald L. Mueller, Dayton, Ohio

[73] Assignee: General Motors Corporation, Detroit, Mich.

[21] Appl. No.: 420,979

[22] Filed: Oct. 13, 1989

[51] Int. Cl.$^5$ .................. G08B 21/00; H01G 5/28
[52] U.S. Cl. .................. 340/620; 73/304 C; 73/304 R; 361/284
[58] Field of Search ......... 340/620; 73/304 C, 304 R; 361/284; 331/141; 338/38

[56] References Cited

U.S. PATENT DOCUMENTS

| | | | |
|---|---|---|---|
| 3,254,333 | 5/1966 | Baumoel | 340/620 |
| 3,694,804 | 9/1972 | Hill | 340/620 |
| 3,918,306 | 11/1975 | Maltby | 361/284 |
| 4,110,740 | 8/1978 | Akita et al. | 340/620 |
| 4,165,509 | 8/1979 | Betts et al. | 73/304 R |

Primary Examiner—Joseph A. Orsino
Assistant Examiner—Kinfe-Michael Negash
Attorney, Agent, or Firm—Robert M. Sigler

[57] ABSTRACT

A washer fluid monitor comprising a pair of electrically conducting probes projecting downward into a washer fluid reservoir and incorporated into part of the positive feedback loop of a Wien bridge oscillator. One of the probes is grounded; and the Wien bridge oscillator is modified with an additional capacitor isolating the other probe from the DC supply and intermediate voltages so that it is essentially grounded at the oscillator frequency to greatly reduce or eliminate ionic currents in the washer fluid and resulting probe degradation without the need for an isolating transformer.

4 Claims, 1 Drawing Sheet

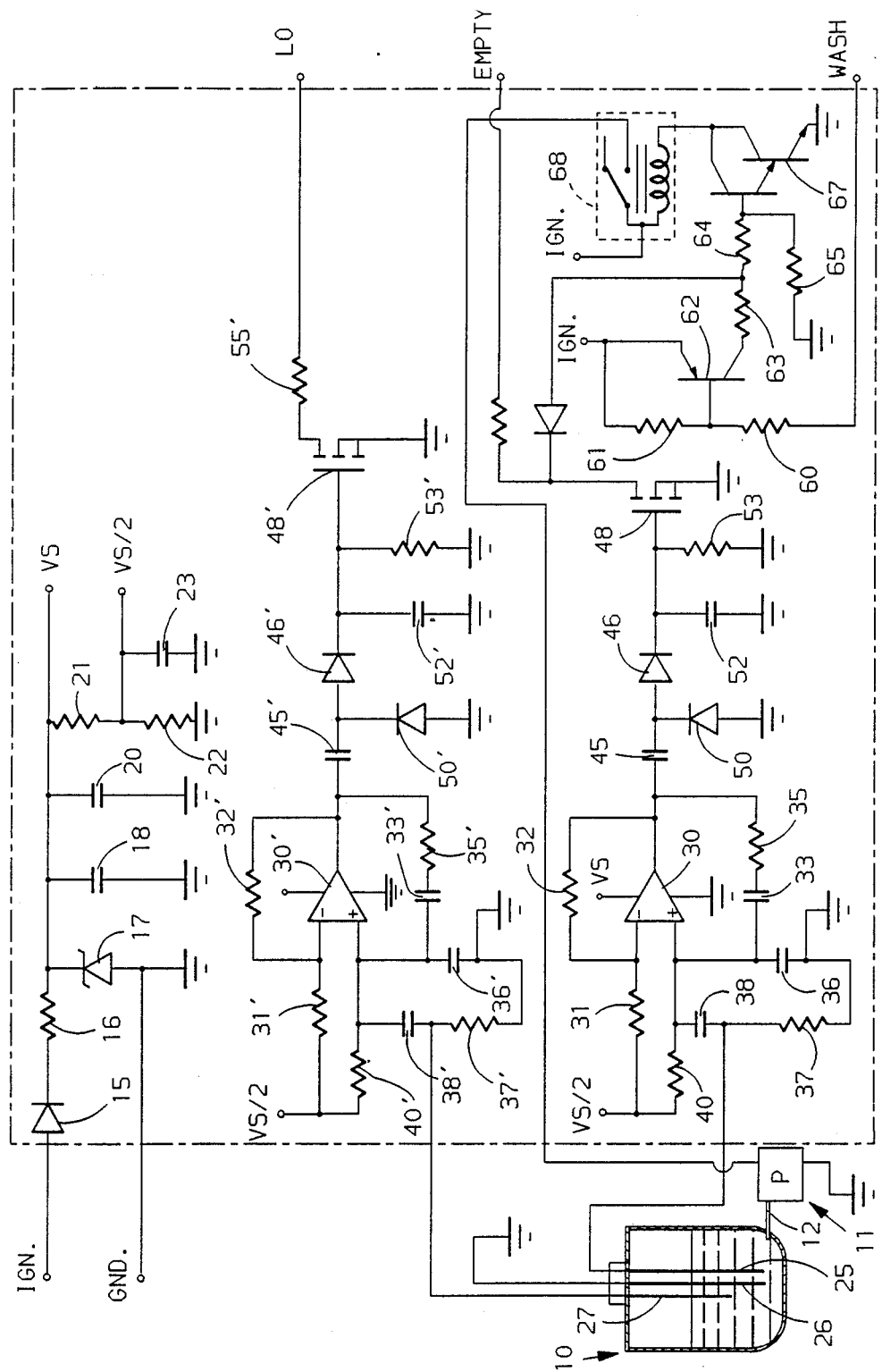

WASHER FLUID MONITOR

BACKGROUND OF THE INVENTION

This invention relates to a washer fluid monitor for a vehicle window washing system, the monitor providing a warning of low washer fluid in a washer fluid reservoir. It is particularly useful for such a system in a vehicle including a DC electrical supply and in which the window washing system includes an electric washer pump motor and/or additional electrically conducting apparatus grounding the washer fluid in the washer fluid reservoir to the DC electrical supply.

A problem with such systems in the prior art occurs at the interface between the electrical monitor and pumping systems and the washer fluid in the reservoir. In many such systems, the monitor probes are connected to different DC voltages from each other and/or from the fluid and thus tend to support an electrolytic action in the washer fluid with a flow of ions which tends to degrade the probes.

This electrolytic action may be reduced or eliminated if both probes and the washer fluid are maintained at substantially the same voltage. A system designed for this purpose is shown in the U.S. Pat No. 4,110,740 to Akita et al, issued Aug. 29, 1978. The system of this patent comprises an oscillator with the probes providing an impedance therebetween which determines the oscillation of the oscillator. The oscillator circuit is arranged so that it oscillates only when there is a high impedance between the probes—that is, when at least one of the probes is out of the fluid. When both probes are in the fluid and the impedance therebetween is low, the oscillator does not oscillate; and both probes are DC grounded. There is thus claimed to be little or no probe degrading ion current flow between the probes. However, the circuit of Akita et al is more expensive to build than is desired, since the main probe is DC isolated from the oscillator circuit with a transformer.

SUMMARY OF THE INVENTION

The washer fluid monitor of this invention provides an oscillator circuit with the probes in the oscillator feedback loop so that oscillation is determined by the impedance between the probes. It is designed so that oscillation occurs only when the impedance is high due to at least one of the probes being out of the washer fluid and no oscillation occurs when both probes are in contact with the washer fluid. Thus, little or no ionic currents are established in the washer fluid; and probe life is greatly increased. However, the washer fluid monitor of this invention uses no expensive transformer to DC isolate the probes from the remainder of the oscillator circuit.

The washer fluid monitor of this invention is based on a Wien bridge oscillator, which, in one form, is a well known oscillator incorporating an operational amplifier with both positive and negative feedback loops arranged as a bridge circuit. Since it is based on an operational amplifier, it requires three supply voltage levels, which are generally shown in textbooks as positive supply voltage, ground, and negative supply voltage. In such textbook applications, the operational amplifier is biased between the positive and negative supply voltages. If such a power supply were available on motor vehicles, the washer fluid probes could thus be DC biased to ground for a minimization of ion current flow in the fluid.

However, motor vehicles are provided with a single sided DC electrical system which provides a positive supply voltage and ground and which may be made to provide an intermediate voltage between the positive supply voltage and ground. Thus, the operational amplifier of a Wien bridge oscillator must actually be powered between supply voltage and ground and the bridge circuit connected between the supply and intermediate voltages. If the standard Wien bridge oscillator is set up in such an arrangement, however, both of the probes will be DC biased to the intermediate voltage or higher, while the washer fluid itself is at ground potential. This may result in significant ionic currents through the washer fluid between either or both of the probes and the ground terminal by way of the washer fluid, conduits, and/or the pump mechanism. Therefore, it is desirable to modify the Wien bridge oscillator to put both probes at or near DC ground potential. It is the modified Wien bridge oscillator that makes this invention possible.

In its broadest aspect, then, the invention is thus a washer fluid monitor for a vehicle window washing system having a washer fluid reservoir with an electrically conducting washer fluid therein, a DC electrical supply with supply voltage, intermediate voltage and ground voltage terminals, and means electrically connecting the washer fluid to the ground terminal. The washer fluid monitor comprises a first electrically conducting probe connected to the ground voltage terminal and disposed in the washer fluid reservoir above a first predetermined level of washer fluid therein and a second electrically conducting probe disposed in the washer fluid reservoir above a second predetermined level of washer fluid therein.

The washer fluid monitor further comprises a Wien bridge oscillator comprising an operational amplifier having power connections to the supply voltage and ground voltage terminals of the DC electrical supply, an inverting input, a non-inverting input and an output, the oscillator further comprising a first resistor connected between the output and inverting input, a second resistor connected between the inverting input and the intermediate voltage terminal, a first capacitor and third resistor connected in series between the output and the non-inverting input, a second capacitor connected between the non-inverting input and the ground terminal, a fourth resistor connected between the intermediate voltage terminal and the non-inverting input, a third capacitor connected between the non-inverting input and the second electrically conducting probe, and a fifth resistor connected between the first and second electrically conducting probes.

Whereas the normal Wien bridge oscillator does not include the fourth resistor or third capacitor and thus oscillates the second electrically conducting probe about the intermediate voltage, the third capacitor of this invention DC isolates the second electrically conducting probe from the non-inverting input of the operational amplifier so that no direct ionic current may flow and the second electrically conducting probe will oscillate around ground potential. The fourth resistor helps maintain the non-inverting input of the operational amplifier at the intermediate voltage so that the oscillator functions essentially as a Wien bridge amplifier. Thus, the advantages of substantially reduced or eliminated ionic currents are obtained without the necessity of a DC isolating transformer.

Further details and advantages of this invention will be apparent from the accompanying drawings and following description of a preferred embodiment.

BRIEF DESCRIPTION OF THE DRAWINGS

The single Figure shows a circuit diagram of a preferred embodiment of this invention.

DESCRIPTION OF THE PREFERRED EMBODIMENT

Referring to the single Figure, a washer fluid reservoir 10 is part of a vehicle washer fluid system including an electric motor driven pump 11 with a pump inlet conduit 12 opening to reservoir 10. A standard DC electrical supply system for the vehicle comprises a normal battery, alternator, voltage regulator, etc., not shown, and provides a DC voltage through an ignition switch, also not shown, at terminal IGN and a ground potential at terminal GND. The voltage at terminal IGN is nominally positive or plus 12-16 volts DC, although it can sometimes drop significantly lower when high current loads are imposed on the system such as during use of an engine starting motor in cold weather.

The IGN terminal is connected through a diode 15 and resistor 16 (120 ohm) to a supply voltage terminal VS. A zener diode 17 connected from terminal VS to ground determines the supply voltage level at approximately 6 volts, as long as the IGN voltage does not fall below this level; and a pair of capacitors 18 (180 uF) and 20 (0.1 uF) from terminal VS to ground provide low pass filtering. A voltage divider comprising a pair of equal valued resistors 21 and 22 (10K) across terminal VS provide half of voltage VS from their junction to an intermediate voltage terminal VS/2 (3 volts); with a capacitor 23 (1.0 uF) to ground providing additional filtering. The GND terminal provides a ground connection to the DC electrical supply for all the circuitry of the Figure, which is preferably on a single circuit board. The washer fluid, being in contact with pump 11 through conduit 12, is grounded by way of metal or other conductive parts in conduit 12 and/or pump 11.

The embodiment of the invention shown actually provides level sensing at two levels within reservoir 10. Thus, three probes are provided. Probes 25 and 26 project downward into reservoir 10 to a lower depth, with probe 26 grounded and probe 25 connected to a first oscillator circuit. A probe 27 projects downward into reservoir 10 to a higher depth and is connected to a second oscillator circuit. The first oscillator circuit may be used to signal low washer fluid, whereas the second may be used to signal some higher fluid level, such as a preliminary low fluid warning or a full reservoir.

Since the oscillator circuits are identical, only one will be described; and the corresponding elements of the other will be given similar but primed reference numerals. An operational amplifier 30 is powered from supply voltage terminal VS and ground and has an inverting input connected through a resistor 31 (10K) to the intermediate voltage terminal VS/2 and an output connected through a negative feedback resistor 32 (200K) to the inverting input. Operational amplifier 30 also has a non-inverting input connected to the output through a capacitor 33 (470 pF) in series with a resistor 35 (470K) and connected to ground through a capacitor 36 (0.0047 uF). In an ordinary Wien bridge oscillator, a resistor such as resistor 37 would be connected in parallel with capacitor 36 to form the complete positive feedback loop. In this circuit, a DC isolating capacitor 38 (0.1 uF) is placed in series with resistor 37 (100K), with the combination in parallel with capacitor 36. The junction of capacitor 38 and resistor 37 is connected to electrically conducting probe 25. In the other oscillator, the corresponding junction between capacitor 38' and resistor 37' is connected to electrically conducting probe 27. A resistor 40 (1M) is provided between the intermediate voltage terminal VS/2 and the non-inverting input of operational amplifier 30.

The negative feedback loop of resistors 31 and 32, one side of the bridge, determines the amplitude of oscillation; while the positive feedback side of the bridge, including elements 33, 35, 36, 37 and 38, determines the frequency of oscillation. The values are set such that, when probes 25 and 26 are connected by washer fluid in reservoir 10 and thus have a low impedance therebetween, no oscillation takes place, whereas, when probes 25 and 26 are not connected through the washer fluid for a high impedance therebetween, oscillation does take place.

The output of operational amplifier 30 is connected through a capacitor 45 (0.01 uF) and diode 46 to the gate of a FET 48 with a grounded source. A diode 50 has a cathode connected to the junction of capacitor 45 and the anode of diode 46 and further has an anode connected to ground. A capacitor 52 (0.1 uF) and resistor 53 (100K) are connected in series from the gate of FET 48 to ground. These elements provide a DC voltage sufficient to turn on FET 48 when the oscillator is oscillating by repeatedly pumping charge onto capacitor 52. When oscillation stops, capacitor 52 discharges through resistor 53 to reduce the gate of FET 48 below the voltage necessary for FET conduction.

FET 48 has a drain connected through a resistor 55 (100 ohm) to a terminal labeled EMPTY, to which terminal can be connected an indicating lamp with a DC source to provide conduction through the lamp and FET when the FET is turned on. Thus, when probe 25 is out of the washer fluid, the oscillator with the unprimed reference numerals oscillates to signal an empty washer fluid reservoir. When the level of fluid in reservoir 10 is high enough to contact probe 25 but is below probe 27, the oscillator with primed coordinates oscillates to turn on FET 48' and provide a current path through an indicating lamp, not shown, connected to terminal LO to indicate low washer fluid. This is a higher fluid level signal than that at the EMPTY terminal.

A closer examination of the oscillator circuit shows how the Wien bridge oscillator has been modified to provide the advantages of this invention. In DC terms, probe 25 is connected to ground through resistor 37 and is DC isolated from the intermediate voltage by capacitor 38. Likewise, probe 27 is connected to ground through resistor 37' and is DC isolated from the intermediate voltage by capacitor 38'. Since probe 26 is grounded and any other metal parts associated with pump 11 and in contact with washer fluid are also grounded, there is no DC current path established through the washer fluid. At the same time, however, resistor 40 will bias the non-inverting input of operational amplifier 30 (and resistor 40' will similarly bias the non-inverting input of operational amplifier 30') at the intermediate voltage for operation. In AC terms, however, capacitor 38 (and 38') is essentially a short circuit; and the Wien bridge oscillator operates in essentially its normal manner as described in the textbooks.

Additional circuitry is provided to provide selective operation of washer pump 11 but prevent such operation when washer fluid level is low (empty). A high voltage washer pump signal is selectively provided, as by a switch, not shown, to a WASH terminal connected through a resistor 60 to the base of a PNP transistor 62 with a resistor 61 across its base/emitter junction. The emitter of transistor 62 is connected to the IGN terminal. The collector of transistor 62 is connected to ground through resistors 63, 64 and 65 in series, so that a ground potential at the WASH terminal turns on transistor 62 and creates a voltage divider action across resistors 63, 64 and 65. The junction of resistors 64 and 65 is connected to the base of an NPN Darlington transistor 67 having a grounded emitter and a collector connected through the activating coil of a relay 68 to the IGN terminal. When transistor 62 is turned on by the WASH signal, it turns on transistor 67, except as described below, to activate relay 68. The armature of relay 68 carries a terminal which, when relay 68 is activated, completes a circuit from the IGN terminal through the motor of pump 11 to ground to activate washer pump 11.

The exception is created by a diode having an anode connected to the junction of resistors 63 and 64 and a cathode connected to the collector of FET 48. When FET 48 is rendered conductive by a low washer fluid level in reservoir 10, the voltage on the base of transistor 67 is clamped low to prevent conduction thereof and thus prevent activation of washer pump 11.

The embodiments of the invention in which an exclusive property or privilege is claimed are defined as follows:

1. A washer fluid monitor for a vehicle window washing system having a washer fluid reservoir with an electrically conducting washer fluid therein, a DC electrical supply with supply voltage, intermediate voltage and ground voltage terminals, and means electrically connecting the washer fluid to the ground voltage terminal, the washer fluid monitor comprising, in combination:

first electrically conducting probe connected to the ground voltage terminal and disposed in the washer fluid reservoir above a first predetermined level of washer fluid therein;

a second electrically conducting probe disposed in the washer fluid reservoir above a second predetermined level of washer fluid therein;

a Wien bridge oscillator comprising an operational amplifier having power connections to the supply voltage and ground voltage terminals of the DC electrical supply, an inverting input, a non-inverting input and an output, the oscillator further comprising a first resistor connected between the output and the inverting input, a second resistor connected between the inverting input and the intermediate voltage terminal, a first capacitor and third resistor connected in series between the output and the non-inverting input, a second capacitor connected between the non-inverting input and the ground terminal, a fourth resistor connected between the intermediate voltage terminal and the non-inverting input, a third capacitor connected between the non-inverting input and the second electrically conducting probe, and a fifth resistor connected between the first and second electrically conducting probes; and signal means responsive to oscillation of the Wien bridge oscillator to generate a low washer fluid signal.

2. The washer fluid monitor of claim 1 in which the second predetermined level of washer fluid is the same or higher than the first predetermined level of washer fluid.

3. The washer fluid monitor of claim 1 in which the Wien bridge oscillator of claim 1 is a first Wien bridge oscillator and which further comprises:

a third electrically conducting probe disposed in the washer fluid reservoir above a third predetermined level of washer fluid higher than the second level of washer fluid therein; and a second Wien bridge oscillator comprising an operational amplifier having power connections to the supply voltage and ground voltage terminals of the DC electrical supply, an inverting input, a non-inverting input and an output, the second Wien bridge oscillator further comprising a sixth resistor connected between the output and the inverting input, a seventh resistor connected between the inverting input and the intermediate voltage terminal, a fourth capacitor and eighth resistor connected in series between the output and the non-inverting input, a fifth capacitor connected between the non-inverting input and the ground terminal, a ninth resistor connected between the intermediate voltage terminal and the non-inverting input, a sixth capacitor connected between the non-inverting input and the third electrically conducting probe, and a tenth resistor connected between the first and third electrically conducting probes, the signal means being further responsive to oscillation of the second Wien bridge oscillator to generate a high washer fluid signal.

4. The washer fluid monitor of claim 1 in which the window washing system further has an electric motor operated pump effective, when activated, to pump washer fluid from the washer fluid reservoir, the washer fluid monitor further comprising means for disabling the electric motor operated pump in response to oscillation of the Wien bridge oscillator.

* * * * *